United States Patent [19]

Roe

[11] Patent Number: 5,256,169
[45] Date of Patent: Oct. 26, 1993

[54] METHODS AND COMPOSITIONS FOR DEWATERING AND SUPPRESSING DUST DURING PROCESSING OF FINE COAL

[75] Inventor: Donald C. Roe, Tabernacle, N.J.

[73] Assignee: Betz Laboratories, Inc., Trevose, Pa.

[21] Appl. No.: 729,522

[22] Filed: Jul. 12, 1991

[51] Int. Cl.$^5$ .............................................. C10L 5/14
[52] U.S. Cl. ..................... 44/626; 44/556; 44/572; 44/594; 44/620
[58] Field of Search ................ 44/620, 626, 556, 572, 44/594

[56] References Cited

U.S. PATENT DOCUMENTS

| | | | |
|---|---|---|---|
| 2,854,347 | 9/1958 | Booth et al. | 117/6 |
| 4,551,261 | 11/1985 | Salihar | 252/88 |
| 4,561,905 | 12/1985 | Kittle | 134/25.1 |
| 4,571,116 | 2/1986 | Patil et al. | 404/76 |
| 4,780,233 | 10/1988 | Roe | 252/88 |
| 4,828,575 | 5/1989 | Bellow, Jr. et al. | 44/626 |
| 4,828,576 | 5/1989 | Bixel et al. | 44/626 |
| 4,830,637 | 5/1989 | Wasson | 44/550 |
| 4,969,928 | 11/1990 | Wen et al. | 44/626 |
| 5,032,146 | 7/1991 | Knudson et al. | 44/626 |

Primary Examiner—Jacqueline V. Howard
Attorney, Agent, or Firm—Alexander D. Ricci; Steven D. Boyd

[57] ABSTRACT

A process of dewatering and agglomerating fine coal. The process consists of treating an aqueous fine coal slurry with a chemical binding agent prior to filtration or drying. The preferred chemical binding agent is an emulsifiable process oil. The process results in more efficient dewatering and low dustiness of the treated coal.

2 Claims, No Drawings

METHODS AND COMPOSITIONS FOR DEWATERING AND SUPPRESSING DUST DURING PROCESSING OF FINE COAL

FIELD OF THE INVENTION

This invention relates to methods and compositions for dewatering and agglomerating coal particles, more particularly fine coal particles.

BACKGROUND OF THE INVENTION

The majority of U.S. Coal preparation industries employ mechanical dewatering techniques such as filtration and centrifugation to reduce the moisture content of fine coal (28 mesh top size) and refuse from processes such as water-only cycloning and froth flotation. Mechanical dewatering is the most economical way of separating water from coal. However, it becomes ineffective for ultra fine coal dewatering because of the larger surface area of the particles. Currently, advanced physical coal cleaning processes are being studied for the benefication of ultra fine coal in order to take advantage of the increased liberation of mineral matter and pyrite that results from ultra fine grinding. Wet processes of ultra fine coal cleaning produce an ultra fine clean coal slurry that is extremely difficult to dewater adequately and presents a variety of handling and transportation problems. Some of the more prevalent problems include increased cost of shipping unwanted moisture, freezing of coal, reduction of BTU content and dust dissemination of the dry ultra fine coal.

Thermal drying is the most effective method for moisture reduction of fine coal and can produce a dry product of even ultra fine coal. However, the process is cost prohibitive. Also, thermal dewatered product owing to its dusty nature and increased reaction rate with oxygen possesses its own set of handling, transportation, and storage problems. Some of these problems include spontaneous combustion, explosion, wind erosion, and dust pollution. Similar problems may arise in the processing of materials such as sulfur, phosphates, clays or other finely divided ores and minerals which may be treated with water and are thereafter dewatered and dried.

The use of binders to agglomerate fine coal prior to thermal drying is known. For example U.S. Pat. No. 4,830,637, Wasson discloses a method and apparatus for increasing the size distribution of a coal preparation plant product by agglomerating dewatered coal fines and cyclone recycled fines prior to thermal drying. The method includes adding a binder to recycle fines from a thermal dryer cyclone underflow to dewatered fines and mixing to form an agglomerate of greater than 28 mesh.

Methods of suppressing coal dust are also known. U.S. Pat. No. 4,561,905, Kittle discloses the use of foamed oil/water emulsions to control coal dust. U.S. Pat. No. 4,780,233, Roe discloses a method of dust suppression for coal and other materials wherein minor amounts of a water insoluble elastomeric polymer are combined with oil containing dust control treatments.

SUMMARY OF THE INVENTION

The present invention provides a process for dewatering and agglomerating fine coal particles. Treatment of fine coal particles in accordance with the methods of the present invention result in more efficient dewatering of the coal and also reduce the dissemination of dust from the dewatered product. The fine coal may be dewatered by filtration, centrifugal dewatering operations and/or thermal dryers.

DESCRIPTION OF THE PREFERRED EMBODIMENTS

The present invention provides a method for dewatering and agglomerating fine coal particles. The methods provide significant advantages over the prior independent dewatering and dust control technology. The present invention is particularly suited to application in coal preparation plants having fine coal circuits that involve filtration and/or centrifugal dewatering operations. The use of the term fine coal herein refers to coal of minus 28 mesh as is common in the coal processing field. Benefits are also recognized in coal processing plants which employ thermal dryers to reduce clean coal moisture levels to meet coal quality specifications due to the improved dewatering at low dustiness of coal treated in accordance with the present invention. The end user of coal treated by the methods of the present invention also benefits because of the essentially dust free nature of the coal which minimizes storage and handling problems.

The methods of the present invention involved treating an aqueous fine coal slurry with a chemical binding agent prior to filtration or drying. The chemical binding agent of the present invention is preferably an emulsifiable process oil. The chemical binding agent is preferably applied to the fine coal slurry as an aqueous emulsion. The chemical binding agent of the present invention may also be applied to the fine coal as a liquid spray.

The chemical binding agent of the present invention is, in general, an emulsifiable process oil. Emulsifiable process oils are oils formulated with additives, primarily surfactants, which allow them to be readily emulsified or solubilized in water. Preferred materials include naphthenic and paraffinic process oils with viscosities in the range of 100 to 750 SSU at 100° F. It was found that oils at the higher end of this preferred viscosity range provide the optimum dust control. The process oil is emulsified into an aqueous solution by the presence of an emulsifying surfactant. The preferred surfactants are anionic and/or nonionic emulsifying agents. The most preferred surfactant is an amine salt of dodecylbenzene sulfonate in combination with oleic acid as a coupling agent. However, a variety of surfactant materials would be expected to perform this emulsification function.

As used broadly herein, the term oil includes mineral (petroleum or petroleum derived), vegetable and animal oils. Any oil material capable of being sprayed or applied via foam may be used. Especially preferred are oils that are capable of being emulsified in an o/w or w/o emulsion. For example, asphalts, extender oils of the types noted in U.S. Pat. No. 4,571,116, heavy process oils, and light process oils may be mentioned. The heavy process oils are of the type specified by Kittle, U.S. Pat. No. 4,561,905. That is, they include asphalt "cut-backs", i.e., asphalt dissolved in a moderately heavy oil such as No. 3 fuel oil, residual fuel oils of relatively high viscosity such as No. 6 Fuel oil, etc. The heavy process oils may be further defined as having viscosities in the range of about 600-7,000 SUS. One exemplary heavy process oil is "Hydrolene 90" sold by Sun Oil Company. This particular product is a low volatile aromatic oil having an SUS viscosity of about 3500 at 38° C.

Preferred oils are classified as "light viscosity process oils." These have SUS viscosities of about 60–600 measured at 38° C. Highly preferred are those having an SUS viscosity of from about 200–400. The latter are commercially available under the "Shellflex", "Tellura" and "Tufflo" trademarks.

Surfactants are used to emulsify the oil/water mixture. For this purpose, well-known commercially available anionic and/or nonionic surfactants suffice. For instance, acceptable anionic surfactants include alkyl aryl sulfonic acids, alkyl sulfonic acids, alkenyl sulfonic acids, sulfonated alkyls, sulfonated alkenyls, sulfated monoglycerides and sulfated fatty esters. Also, long chain alpha olefin sulfonates, water soluble salts of alkenyl sulfonic acid, water soluble alkyl aryl sulfonic acid salts, water soluble salts of sodium lauryl sulfate, etc., may be mentioned.

Nonionic surfactants which may be used include ethylene oxide condensates of alkyl phenols, ethylene oxide condensates of straight chain alcohols, fatty acid amides, etc.

The water insoluble elastomers which may be used are those described in U.S. Pat. No. 4,551,261 (Salihar) and Booth et al., U.S. Pat. No. 2,854,347. These generally may be described as being synthetic rubber-like polymers which encompass copolymers of butadiene with a monoolefinic monomer such as styrene, methylstyrene, dimethyl styrene, and acrylonitrile. Copolymers of methyl, ethyl and butyl acrylates with acrylonitrile or with styrene may also be mentioned. Plasticized polyvinyl acetate, plasticized poly vinyl chloride, plasticized polystyrene, plasticized substituted polystyrenes, and plasticized polyolefines such as polyethylenes and polyisobutylenes are suitable. At present, it is preferred to utilize a polyisobutylene elastomer having a molecular weight within the range of about 500,000 to about 2 million, with a particular polyisobutylene of around 1 million molecular weight being especially preferred.

In order to determine the efficiency of the methods of the present invention a series of laboratory tests were undertaken. Coal samples from two working coal mines were obtained for testing. The samples were thermal dryer fines. The as-received samples were tested in a conventional manner for sieve and moisture analysis and critical surface moisture for dust suppression. Chemical binder testing then proceeded under simulated prefiltration, prethermal dryer and post thermal dryer conditions. The as-received coal samples were air dried in an environmental chamber at 20° C. and 50% relative humidity to constant weight. The samples were then riffled into uniform sub-samples for analysis. For the prefiltration binder study testing the samples were sieved to minus negative 28 mesh. The binders were added to a coal/water slurry, prior to filtration at a rate of 7.2 gallons of solution per ton. For the post filtration binder studies and a post thermal dryer binder studies and binders were applied to thermal drier fines by spraying at a rate of 7.2 gallons of solution per ton and uniformly stirring for one minute.

Relative dustiness measurements were made at equilibrium (constant weight) moisture conditions under air drying (20° C. and 50% relative humidity) and oven drying conditions. The relative dustiness index (RDI) is a technique for comparing the relative dustiness of bulk solids. RDI is defined as:

$$RDI = \frac{RDN\ (\%\ -\frac{1}{4}\ inch)\ 250\ grams}{Sample\ weight\ (grams)}$$

RDN is the relative dustiness number as determined experimentally with a laboratory dust chamber. Sample weight and particle size are standardized at 250 grams of negative $\frac{1}{4}''$ material and factered into the RDI calculation to allow comparison between different test samples and substrates. In evaluating the effects of the chemical treatments, percent dust suppression (% DS) is calculated from the RDI values as:

$$\%\ DS = \frac{(control\ RDI\ -\ treated\ RDI)}{Control\ RDI} \times 100\%$$

The invention will be further illustrated by the following examples which are included as being illustrations of the invention and should not be construed as limiting the scope thereof.

EXAMPLES

The materials tested throughout the following examples are identified in Table I.

TABLE 1

| Description of Chemical Binding Agents | |
|---|---|
| A | Anionic, emulsion polymer |
| B | Anionic, water-based polymer |
| C | Emulsifiable, low viscosity oil, oil-based polymeric binder (1%) anionic emulsifier |
| D | Foamable, oil-based polymeric binder |
| E | Polymer-based |
| F | Latex polymer |
| G | Petroleum resin emulsion |
| H | Polymer-based |
| I | Lignosulfonate-based binder |
| J | Emulsifiable, low viscosity oil, oil-based polymeric binder (5%), anionic emulsifier |
| K | Emulsifiable, high viscosity oil, oil-based polymeric binder (1%), anionic emulsifier |
| L | Emulsifiable, low viscisity oil, oil-based polymeric binder (1%) anionic emulsifier |
| M | Emulsifiable, low viscosity oil, oil-based polymeric binder (1%), nonionic emulsifier |

Table 2 summarizes the results of the filtration portion of the binder prefiltration study. As shown, a number of products effected filtration rate, final vacuum (a measure of cake porosity) and cake moisture.

TABLE 2

Effect of Binding Agents on the Dewatering Characteristics of −28 Mesh Coal Samples

| Treatment Name | Filter Time (sec) | Final Vacuum (in Hg) | % Air Dry Loss | % Residual Moisture | % Total Moisture |
|---|---|---|---|---|---|
| COAL TYPE A | | | | | |
| Control | 5.2 | 7.0 | 30.0 | 2.32 | 32.32 |
| G | 3.7 | 3.5 | 32.0 | 2.49 | 34.49 |
| I | 6.0 | 9.0 | 33.7 | 1.77 | 35.47 |
| A | 3.5 | 1.5 | 30.9 | 2.33 | 33.23 |
| E | 5.1 | 6.0 | 28.9 | 2.19 | 31.09 |
| H | 5.3 | 6.0 | 31.1 | 2.40 | 33.50 |
| F | 5.0 | 3.5 | 29.0 | 2.05 | 31.05 |
| B | 5.2 | 6.0 | 30.2 | 2.27 | 32.47 |
| M | 3.9 | 3.0 | 31.1 | 2.18 | 33.28 |
| K | 4.2 | 2.0 | 28.7 | 2.16 | 30.90 |
| L | 4.9 | 3.0 | 25.7 | 2.25 | 27.95 |
| COAL TYPE B | | | | | |
| Control | 9.8 | 8.0 | 25.2 | 1.44 | 26.64 |
| G | 6.2 | 5.5 | 27.6 | 1.43 | 26.93 |
| I | 15.6 | 18.0 | 27.4 | 1.34 | 28.74 |
| A | 16.4 | 2.0 | 29.1 | 1.25 | 30.35 |
| E | 6.9 | 5.0 | 24.9 | 1.43 | 26.33 |

TABLE 2-continued

Effect of Binding Agents on the Dewatering Characteristics of −28 Mesh Coal Samples

| Treatment Name | Filter Time (sec) | Final Vacuum (in Hg) | % Air Dry Loss | % Residual Moisture | % Total Moisture |
|---|---|---|---|---|---|
| H | 7.9 | 8.0 | 26.3 | 1.44 | 27.74 |
| F | 7.4 | 4.5 | 25.2 | 1.30 | 26.50 |
| B | 7.4 | 10.0 | 27.2 | 1.42 | 28.62 |
| M | 6.2 | 3.5 | 25.5 | 1.43 | 26.93 |
| K | 7.4 | 4.0 | 23.6 | 1.18 | 24.77 |
| L | 4.3 | 3.5 | 21.3 | 1.57 | 22.91 |

Tables 3 and 4 summarize the results of pre and post thermal dryer binding agent dust control studies. In both cases, the binding agents were tested as applied in a liquid spray and applied in a foam which employed 2% anionic foaming agent such as CM-500 available from Betz Laboratories, Inc., Trevose, Pa. Table 3 summarizes data from post thermal dryer applications where the coal is subjected to ambient drying conditions. Table 4 summarizes data from pre-thermal dryer binder application where the coal is subjected to oven drying conditions. Tables 5 and 6 summarize the relative dustiness of the prefiltration binder study filter cake samples. The oven dried samples were subjected to 105° C. (220° F.) for more than an hour.

TABLE 3

Effect of Binding Agents on the Relative Dustiness of Air-Dried (20° C.) Coal Samples

| | COAL TYPE A | | COAL TYPE B | |
|---|---|---|---|---|
| Treatment | RDI | % D.S. | RDI | % D.S. |
| SPRAYED BINDING AGENT | | | | |
| Control | 78.3 | 0 | 133.8 | 0 |
| C | 10.0 | 87.2 | 11.3 | 91.6 |
| F | 46.8 | 40.3 | 62.0 | 53.6 |
| A | 42.3 | 46.0 | 49.5 | 63.0 |
| H | 29.0 | 62.9 | 36.0 | 73.1 |
| E | 24.5 | 68.7 | 24.5 | 81.7 |
| I | 7.5 | 90.4 | 40.0 | 70.1 |
| FOAMED BINDING AGENT | | | | |
| Control | 85.5 | 0 | 89.3 | 0 |
| D/CM-500 | 15.5 | 81.9 | 9.0 | 89.9 |
| F/CM-500 | 70.5 | 17.5 | 26.5 | 70.3 |
| B/CM-500 | 46.5 | 45.6 | 30.0 | 66.4 |
| H/CM-500 | 55.5 | 35.1 | 36.3 | 59.4 |
| E/CM-500 | 51.3 | 39.5 | 29.3 | 67.2 |
| I/CM-500 | 34.0 | 60.2 | 8.8 | 90.2 |

TABLE 4

Effect of Binding Agents on the Relative Dustiness of Oven-Dried (50° C.) Coal Samples

| | COAL TYPE A | | COAL TYPE B | |
|---|---|---|---|---|
| Treatment | RDI | % D.S. | RDI | % D.S. |
| SPRAYED BINDING AGENT | | | | |
| Control | 123.3 | 0 | 124.3 | 0 |
| C | 45.5 | 63.1 | 58.0 | 53.3 |
| F | 115.5 | 6.3 | 107.3 | 13.7 |
| A | 119.5 | 3.0 | 87.3 | 29.8 |
| H | 99.0 | 19.7 | 82.0 | 34.0 |
| E | 100.0 | 18.9 | 59.0 | 52.5 |
| I | 107.5 | 12.8 | 93.3 | 24.9 |
| FOAMED BINDING AGENT | | | | |
| Control | 114.8 | 0 | 100.8 | 0 |
| D/CM-500 | 36.0 | 68.6 | 36.5 | 63.8 |
| F/CM-500 | 98.3 | 14.4 | 89.0 | 11.7 |
| B/CM-500 | 107.0 | 6.8 | 98.5 | 2.2 |
| H/CM-500 | 130.0 | 0 | 80.0 | 20.6 |
| E/CM-500 | 112.3 | 1.7 | 95.3 | 5.5 |
| I/CM-500 | 86.5 | 24.6 | 84.3 | 16.4 |

TABLE 5

Effect of Binding Agents, Applied to −28 Mesh Coal Slurries Prior to Vacuum Filtration, on the Relative Dustiness of Air-Dried (20° C.) Filter Cake

| | COAL TYPE A | | COAL TYPE B | |
|---|---|---|---|---|
| Treatment | RDI | % D.S. | RDI | % D.S. |
| Control | 95.8 | 0 | 130.8 | 0 |
| G | 77.3 | 19.3 | 40.5 | 69.0 |
| I | 121.8 | 0 | 65.0 | 50.3 |
| A | 133.0 | 0 | 87.8 | 32.9 |
| E | 177.3 | 0 | 65.5 | 49.9 |
| H | 144.5 | 0 | 96.3 | 26.4 |
| F | 142.3 | 0 | 87.5 | 33.1 |
| B | 129.3 | 0 | 117.3 | 10.3 |
| J | 27.8 | 71.0 | — | — |
| K | — | — | 20.5 | 84.3 |
| L | 21.3 | 78.9 | 18.0 | 86.2 |

TABLE 6

Effect of Binding Agents, Applied to −28 Mesh Coal Slurries Prior to Vacuum Filtration, on the Relative Dustiness of Oven-Dried (105° C.) Filter Cake

| | COAL TYPE A | | COAL TYPE B | |
|---|---|---|---|---|
| Treatment | RDI | % D.S. | RDI | % D.S. |
| Control | 167.0 | 0 | 119.3 | 0 |
| G | 138.5 | 17.1 | 89.0 | 25.4 |
| I | 121.8 | 27.1 | 84.5 | 29.1 |
| A | 152.5 | 8.7 | 79.5 | 33.3 |
| E | 169.3 | 0 | 79.5 | 33.3 |
| H | 169.0 | 0 | 110.3 | 7.5 |
| F | 133.0 | 20.4 | — | — |
| B | 129.3 | 22.6 | 132.0 | 0 |
| J | 42.8 | 74.4 | — | — |
| K | — | — | 23.3 | 80.5 |
| L | 46.0 | 72.5 | 39.5 | 66.9 |

While the invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of dewatering fine coal and reducing residual moisture and the dissemination of fugitive dust from dewatered fine coal which comprises:

treating an aqueous slurry of fine coal with an emulsifiable process oil comprising a naphthinic or paraffinic process oil having an SUS viscosity at 100° F. of from about 100 to about 750 in combination with an elastomeric polymer and an anionic and/or nonionic surfactant;

dewatering the slurry of fine coal by filtration and/or centrifugation to form a filter cake wherein said emulsifiable process oil reduces residual moisture in the filter cake; and drying said filter cake wherein said emulsifiable process oil reduces the dissemination of fugitive dust from the dry filter cake.

2. The method of claim 1 wherein said emulsifiable process oil is formulated with an amine salt of dodecylbenzene sulfonate in combination with oleic acid.

* * * * *